(12) United States Patent
Song et al.

(10) Patent No.: US 11,842,704 B2
(45) Date of Patent: Dec. 12, 2023

(54) MAINBOARD WITH AT LEAST TWO INTERFACES TO BOOST PERFORMANCE FOR CONNECTING DIFFERENT DISPLAYS AND THE RELATED DEVICE AND METHOD

(71) Applicant: MediaTek Singapore Pte. Ltd., Singapore (SG)

(72) Inventors: Xiaobing Song, Shenzhen (CN); Mingbo Wen, Shenzhen (CN); Chunping Han, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/515,936

(22) Filed: Nov. 1, 2021

(65) Prior Publication Data
US 2022/0139347 A1 May 5, 2022

(30) Foreign Application Priority Data
Nov. 2, 2020 (CN) .......................... 202011204655.2

(51) Int. Cl.
*G09G 3/36* (2006.01)
(52) U.S. Cl.
CPC ... *G09G 3/3648* (2013.01); *G09G 2310/0289* (2013.01); *G09G 2330/021* (2013.01)
(58) Field of Classification Search
CPC ...... G09G 3/36; G09G 3/3611; G09G 3/3614; G09G 3/3622; G09G 3/3625;
(Continued)

(56) References Cited

U.S. PATENT DOCUMENTS 9,286,855 B2 3/2016 Tripathi
2006/0227082 A1* 10/2006 Ogata .................. G09G 3/3291
345/76

(Continued)

FOREIGN PATENT DOCUMENTS

CN 1848213 A 10/2006
CN 101699423 A 4/2010
(Continued)

OTHER PUBLICATIONS

Chinese language office action dated May 31, 2022, issued in application No. TW 110124877.
(Continued)

*Primary Examiner* — Amit Chatly
*Assistant Examiner* — Nelson Lam
(74) *Attorney, Agent, or Firm* — McClure, Qualey & Rodack, LLP

(57) ABSTRACT

A mainboard, display device, displaying method, and computer readable storage medium are provided. The mainboard has at least two display interfaces, a detecting circuit, and a processor. The at least two display interfaces are used for connecting to different displays. The detecting circuit is coupled to the at least two display interfaces, for detecting the electrical signal of the display. The processor is coupled to the detecting circuit, for determining information about the display connected to the display interface based on the electrical signal detected by the detecting circuit.

11 Claims, 7 Drawing Sheets

(58) Field of Classification Search
CPC ................ G09G 3/3648; G09G 5/006; G09G 2310/0289; G09G 2330/021
USPC ..................................... 345/1.1–1.3, 87–104
See application file for complete search history.

(56) References Cited

U.S. PATENT DOCUMENTS

| | | | | |
|---|---|---|---|---|
| 2010/0085274 | A1* | 4/2010 | Kilpatrick, II | G06F 1/1641 345/1.3 |
| 2011/0080485 | A1* | 4/2011 | Kimoto | H04N 23/667 348/192 |
| 2011/0304522 | A1* | 12/2011 | Zeng | G09G 5/006 345/1.1 |
| 2015/0213776 | A1* | 7/2015 | Sharma | G09G 5/005 345/520 |
| 2017/0076689 | A1* | 3/2017 | Kumar | H04L 25/0272 |
| 2018/0025689 | A1* | 1/2018 | Aamold | G09G 3/32 345/212 |
| 2019/0103073 | A1* | 4/2019 | Choi | G09G 5/10 |
| 2021/0117205 | A1* | 4/2021 | Bhuiyan | G06F 9/44536 |

FOREIGN PATENT DOCUMENTS

| | | | |
|---|---|---|---|
| CN | 101814280 | A | 8/2010 |
| CN | 101841590 | A | 9/2010 |
| CN | 102685283 | A | 9/2012 |
| CN | 202551158 | U | 11/2012 |
| CN | 102881265 | A | 1/2013 |
| CN | 104104763 | A | 10/2014 |
| CN | 104318882 | A | 1/2015 |
| CN | 105791996 | A | 7/2016 |
| CN | 106878814 | A | 6/2017 |
| CN | 107343213 | A | 11/2017 |
| CN | 110111710 | A | 8/2019 |
| CN | 209486417 | U | 10/2019 |
| CN | 213069082 | U | * 4/2021 |
| TW | 201428730 | A | 7/2014 |

OTHER PUBLICATIONS

Chinese language office action dated Aug. 15, 2023, issued in application No. CN 202011204655.2.

* cited by examiner

MAINBOARD WITH AT LEAST TWO INTERFACES TO BOOST PERFORMANCE FOR CONNECTING DIFFERENT DISPLAYS AND THE RELATED DEVICE AND METHOD

CROSS REFERENCE TO RELATED APPLICATIONS

This application claims priority of China Patent Application No. 202011204655.2, filed on Nov. 2, 2020, the entirety of which is incorporated by reference herein.

BACKGROUND OF THE INVENTION

Field of the Invention

The present application is related to display technology, especially to a mainboard, display device, displaying, and computer readable storage medium.

Description of the Related Art

With the development of display technology, display devices such as LCD TVs and computers have become widespread. There are more and more varieties of display devices to satisfy consumer demand. However, the mainboards currently used in display devices that are compatible with a variety of displays have poor performance.

BRIEF SUMMARY OF THE INVENTION

A mainboard, display device, displaying, and computer readable storage medium are provided in the present application to boost performance of a device that is compatible with a variety of displays.

In order to solve the problems described above, a mainboard including a processor a detecting circuit, and at least two display interfaces are provided by the present application. The at least two display interfaces are used for connecting to different displays. The detecting circuit is coupled to the at least two display interfaces, and is used for detecting the electrical signal of the display. The processor, which is coupled to the detecting circuit, is used for determining information about the display connected to the display interface based on the electrical signal detected by the detecting circuit. The mainboard also includes a PMIC (Power Manage IC) that is coupled to the processor, and the information about the display may include the power parameters of the display. The processor uses the power parameters of the display to initialize the PMIC. The mainboard also includes a level shift IC that is coupled to the processor, and the information about the display may include a level-shift parameter. The processor uses the level-shift parameter of the display to initialize the level shift IC. The mainboard also includes a TCON (Timing Controller) that is coupled to the processor, and the information about the display includes a timing-control parameter. The processor uses the timing-control parameter of the display to initialize the TCON. The mainboard also includes at least two detecting resistors, one end of each of the detecting resistors is one-to-one connected to the display interface, and the other end is connected to the detecting circuit. The detecting circuit includes a modulus converter that is connected to the other end of the detecting resistor. A first detecting resistor of the detecting circuit is coupled to a first interface of a first display, and a second detecting resistor of the detecting circuit is coupled to a second interface of a second display, wherein the first interface is different from the second interface. The electrical signal is a voltage signal, and the processor stores a table of correspondence between the voltage signal and the information about the display.

In order to solve the problems described above, a display device is provided by the present application. The display device includes a display and the mainboard that is described above. The display is connected to the corresponding display interface on the mainboard.

In order to solve the problems described above, a displaying is provided by the present application. The displaying is applied in a mainboard that includes a detecting circuit, at least two interfaces, and a processor. The detecting circuit is electrically connected to the at least two displays, and the processor is coupled to the detecting circuit. The displaying includes the following steps. The processor obtains an electrical signal detected by the detecting circuit. The processor determines information about the display based on the electrical signal. The mainboard includes a PMIC and a TCON. Information about the display includes the power parameter and the timing-control parameter of the display. The processor calls the power parameter of the display to initialize the PMIC, causing the PMIC to output the correct voltage to the display. The processor calls the timing-control parameter of the display to initialize the TCON, causing the TCON to output the correct signal to the display.

In order to solve the problems described above, a computer readable storage medium is provided by the present application. A computer program is stored on the computer readable storage medium. Steps of the method described above are implemented when the program is executed by a processor.

Regarding the method of the present application, the processor is coupled to the detecting circuit, the detecting circuit is coupled to at least two display interfaces, which are used for connecting to different respective displays, allowing the processor to detect the electrical signal of the display that is connected to the display interface through the detecting circuit, and accurately determine the information about the display that is connected to the display interface based on the electrical signal detected by the detecting circuit, so as to boost performance of a device that is compatible with a variety of displays.

BRIEF DESCRIPTION OF THE DRAWINGS

In order to more clearly illustrate the technical solutions of the embodiments of the present application, the drawings used in the description of the embodiments will be briefly described below. Obviously, the drawings in the following description are only some examples or embodiments of the present application, and persons having ordinary skills in the art can obtain other drawings according to the drawings without any creative work.

DETAILED DESCRIPTION OF THE INVENTION

For those skilled in the art to better understand the technical scheme of the present application, the drawings and specific embodiments will be used together to further describe the mainboard, display device displaying, and computer readable storage medium provided by the present application in detail.

The terms "first", "second", and "third" in this application are for descriptive purposes only, and cannot be understood as indicating or implying relative importance or implicitly indicating the number of indicated technical features. Thus, the features defined as "first", "second", and "third" may explicitly or implicitly include at least one of the features. In the description of this application, the meaning of "plurality" is at least two, such as two, three, etc., unless otherwise specifically limited.

Reference herein to "embodiments" means that specific features, structures, or characteristics described in connection with the embodiments may be included in at least one implementation of this application. The appearance of the phrase in various places in the specification does not necessarily refer to the same embodiment, nor is it an independent or alternative embodiment mutually exclusive with other embodiments. Those skilled in the art understand explicitly and implicitly that the embodiments described herein can be combined with other embodiments.

Currently, the displays used by the TV manufacturers usually have two types, built-in Tcon and Tcon-less. For a built-in Tcon TV, a mainboard SOC (system on a chip) outputs the V-By-One signal to a Tcon device of the display after the built-in Tcon TV is turned on, and the signal will be outputted to the display after being processed by the Tcon device. For a TV with Tcon-less display, the mainboard SOC outputs the data signal and the time signal to the display. In addition, demands for the data signal and the time signal are different for different Tcon-less displays. Thus, TV manufacturers are required to deploy different TV mainboards for different displays, which costs considerable amount of manpower, material, and financial resources. Hence, a mainboard and TV that self-adjusts signal outputs, allows self-detecting the display model, and thereby provides suitable initialization for the display. Thus, TV manufactures will be allowed to use a general self-adjusting mainboard to adapt to multiple displays, without needing to deploy a dedicated mainboard for each display model. As a result, the burden for TV manufacturers is significantly reduced.

Figure 1:
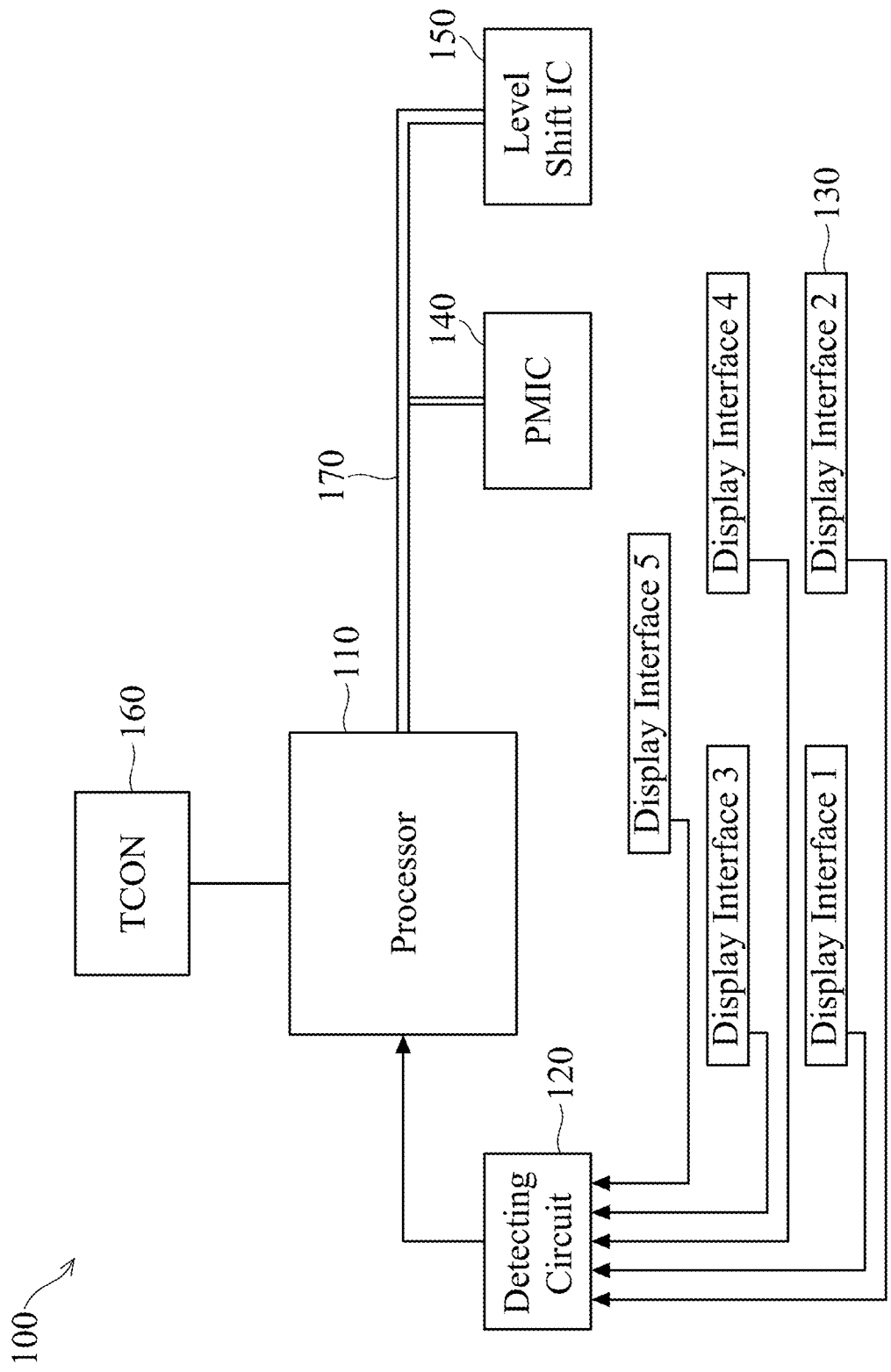
FIG. 1 is the structure diagram of an embodiment of the mainboard provided by the present application.

A mainboard 100 is provided by the first aspect of the present application. FIG. 1 is the structure diagram of the first embodiment of the mainboard 100. As shown in FIG. 1, the mainboard 100 may include at least two display interfaces 130, a detecting circuit 120, and a processor 110. Each of the at least two display interfaces 130 is connected to a different display. The detecting circuit 120 is coupled to the at least two display interfaces 130, for detecting the electrical signal of the displays. The processor 110 is coupled to the detecting circuit 120, for determining information about the display that is connected to the display interface 130 based on the electrical signal detected by the detecting circuit 120.

In this embodiment, the processor 110 is coupled to the detecting circuit 120, the detecting circuit 120 is coupled to the at least two display interfaces 130, and the at least two display interfaces 130 are used for connecting to different displays, such as displays from different manufacturers with different configurations. Thus, the processor 110 is allowed to detect the electrical signal of the display that is connected to one of the display interfaces 130, and accurately determine the information about the display that is connected to the corresponding display interface 130 based on the electrical signal detected by the detecting circuit 120.

Figure 2:
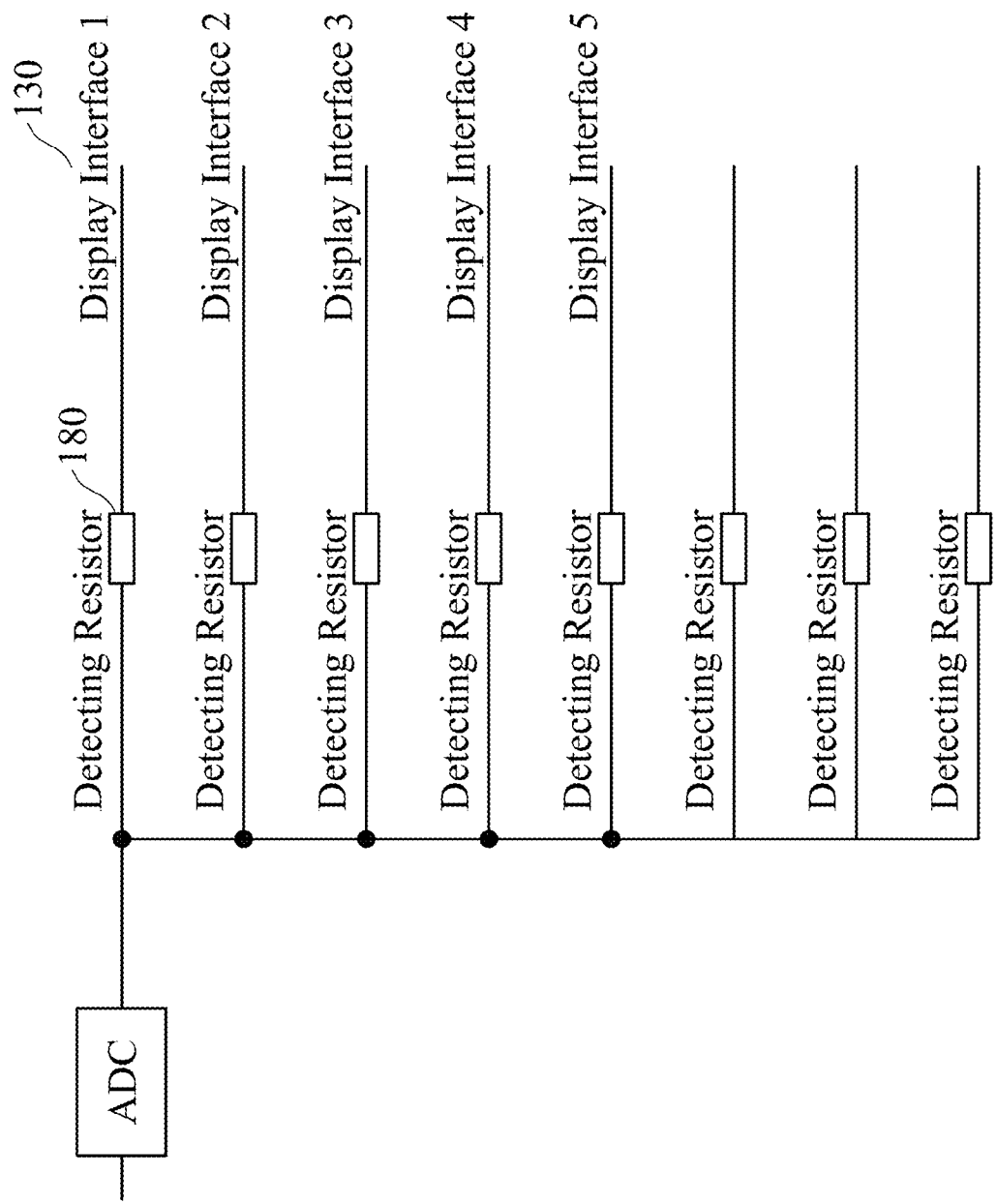
FIG. 2 is the connection diagram of the detecting circuit and the detecting resistor provided by the present application.

As shown in FIG. 1 and FIG. 2, the detecting circuit may include at least two detecting resistors 180 that are connected in parallel. One end of each detecting resistor 180 is one-to-one connected to a corresponding display interface 130, and the other end of each detecting resistors 180 is connected to the analog-to-digital converter (ADC) (e.g., Successive-approximation register ADC; SAR ADC) of the processor 110 (in another embodiment, the ADC is in the detecting circuit 120), to form a voltage-divider circuit by connecting an external pull-up resistor and the detecting resistor 180 in series. When different display interfaces 130 are connected to displays, the detecting circuit 120 can output different electrical signals, such as voltage signals with different values, such that the processor 110 is allowed to determine which display interface 130 is connected to a display according to the electrical signal provided by the detecting circuit 120, to determine the display model and thereby determine the information about the display according to the display model.

The resistances of the at least two detecting resistors 180 can be equal or not equal. The detecting circuit may include multiple detecting resistors connected in parallel. For example, as shown in FIG. 2, the detecting circuit 120 includes eight detecting resistors 180, and thus information about eight different models of displays can be detected by respectively coupling the eight detecting resistors 180 to the eight display interfaces 130. FIG. 2 illustrates an exemplary embodiment of the display interfaces 1 to 5.

In addition, the detecting circuit 120 may include an ADC that is electrically connected to the other end of the detecting circuit 180, so as to convert the detected electrical signal of the display into a digital signal, and determine the information about the display according to the digital signal. The detecting circuit 120 may include an SAR ADC, for example.

The detecting circuit 120 and the processor 110 may both be integrated into an SOC (system on a chip) of the mainboard 100. Under this condition, every display interface 130 needs to occupy one pin of the SOC. If the quantity of the display interfaces 130 that need to be configured is too large, the quantity of pins of the SOC may be insufficient. Therefore, the detecting circuit 120 may not be integrated into the SOC of the mainboard 100, so that the detecting circuit 120 occupies only one pin of the SOC.

Figure 3:
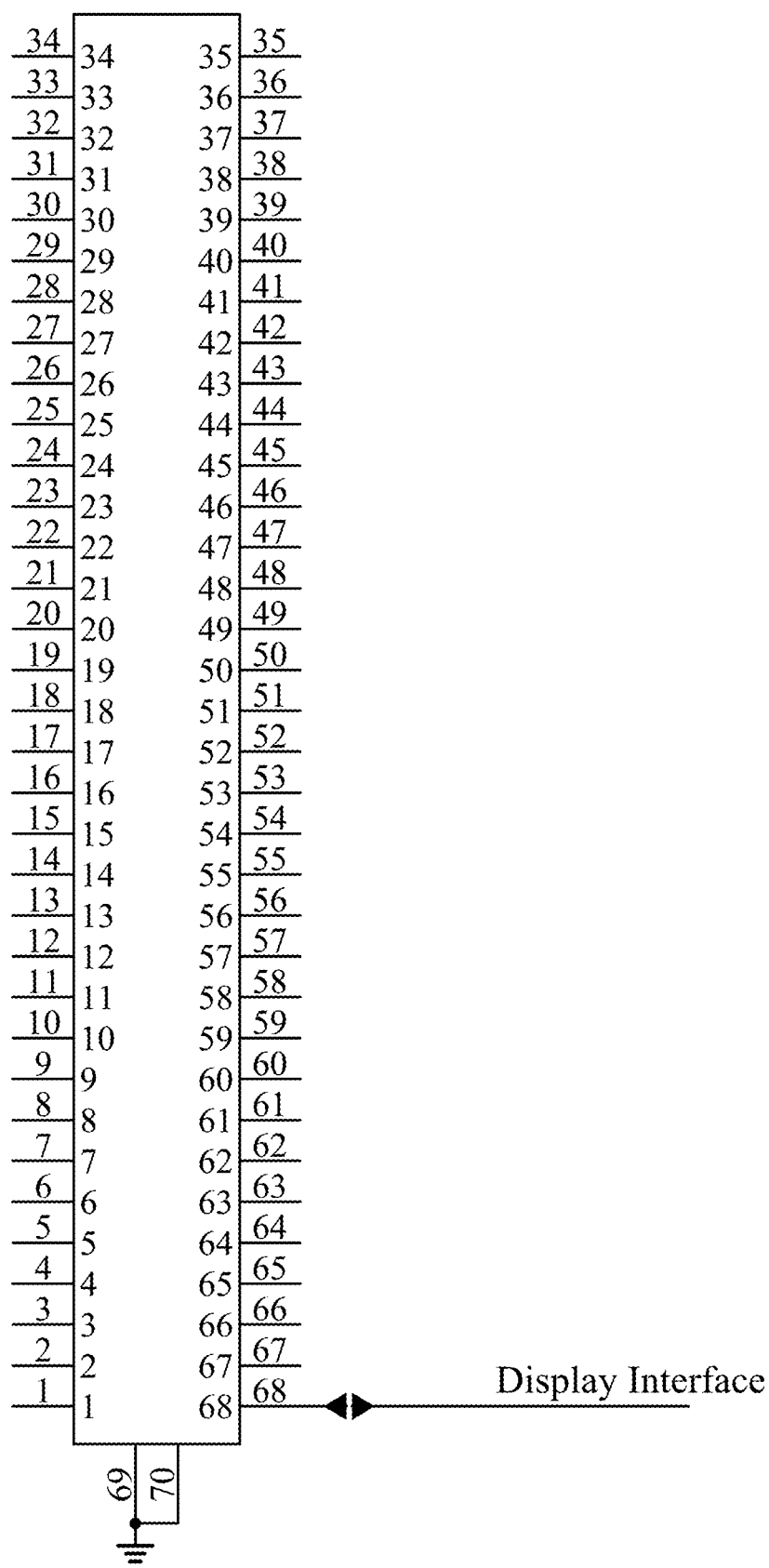
FIG. 3 is the schematic diagram of the display connector of a display provided by the present application.
Figure 4:
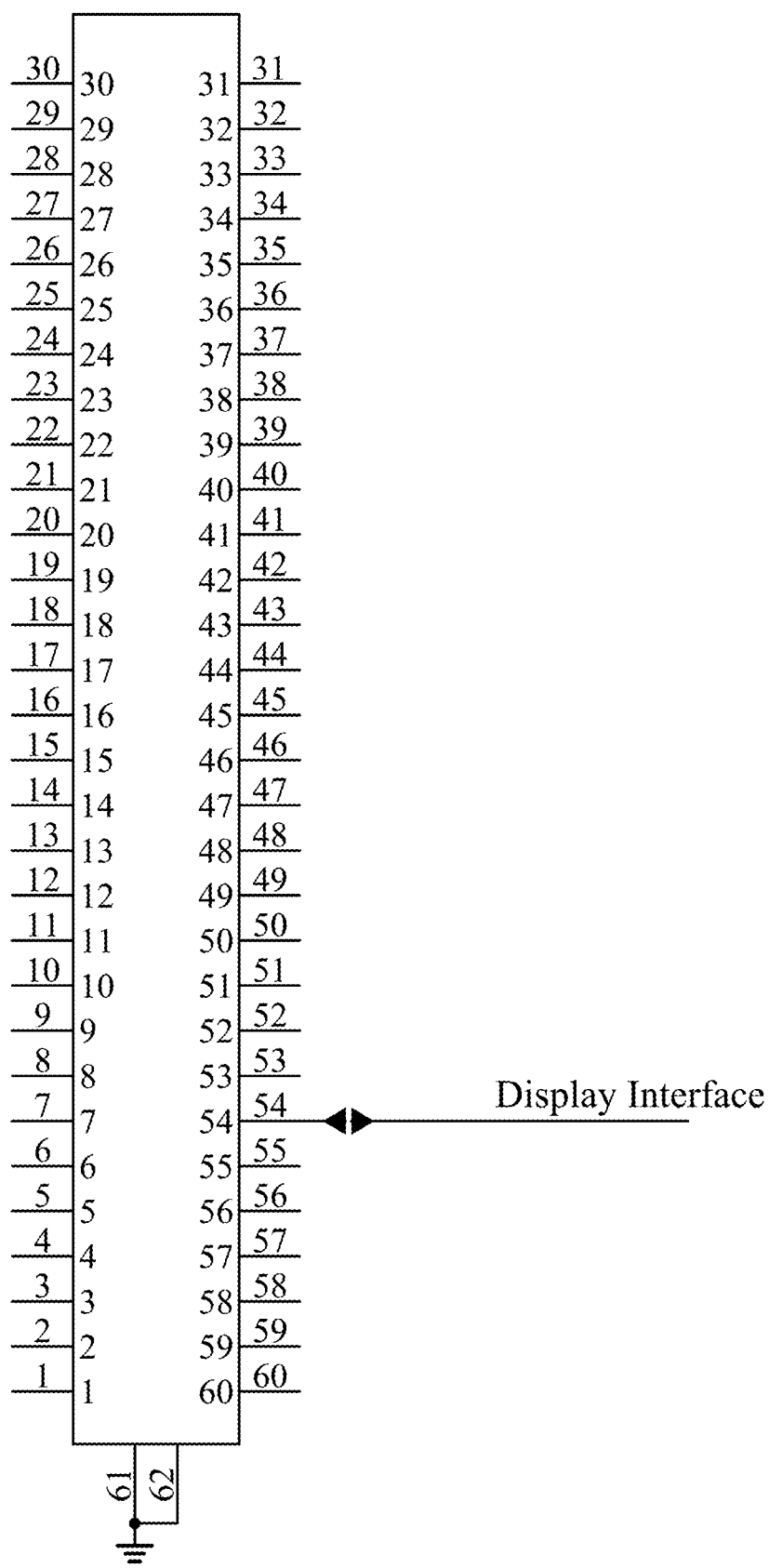
FIG. 4 is the schematic diagram of the display connector of another display provided by the present application.

Optionally, the at least two display interfaces 130 can be different. Specifically, the differences between different display models may be found, and the display interfaces 130 corresponding to the display models may be redefined based on the uniqueness of each display models, so that the detecting circuit 120 can detect the electrical signal of the display only if a particular display is correctly connected to the corresponding display interface 130. If the display is incorrectly connected to other display interfaces 130, the detecting circuit 120 cannot detect the electrical signal of the display, so as to ensure the accuracy of the display signal that is automatically confirmed by the mainboard 100. For example, as may be shown in FIG. 3, an exemplary 68-pin display connector of the display is corresponding to a particular display, such as the display with model 1. The $68^{th}$ pin of the display connector is coupled to the display interface 1 of the mainboard instead of being connected to GND of the mainboard, so as to allow the detecting circuit 120 to only detect the electrical signal of the corresponding display, and thus the processor may determine that the particular display currently connected is the display with model 1 through the electrical signal detected by the detecting circuit 120. For another example, as may be shown in FIG. 4, the $7^{th}$ pin at the XL end of the display connector of another display with model 2 is coupled to the display interface 2 of the mainboard instead of being connected to GND of the mainboard, so as to allow the detecting circuit 120 to only detect the electrical signal of the corresponding display, and thus the processor may determine that the particular display currently connected is the display with model 2 through the electrical signal detected by the detecting circuit 120. The first detecting resistor 180 of the detecting circuit 120 is coupled to the first interface of the first display 1, for example, and the second detecting resistor 180 of the detecting circuit 120 is coupled to the second interface of the second display through the display interface 2, wherein the first interface is different from the second interface.

Optionally, the mainboard 100 may also include a PMIC (Power Manage Integrated Circuit) 140 that is coupled to the processor 110. The PMIC 140 may generate the multi-way voltages required by a source driver and a gate driver. The processor 110 may invoke the power parameter of the display based on the electrical signal detected by the detecting circuit 120 to initialize PMIC 140, so that the PMIC 140 outputs the correct voltage signal to the display to ensure the display's normal operation. It may be appreciated that the correspondence between the power parameter of the display and the electrical signal of the detecting circuit 120 can be stored in the processor 110, so that the processor 110 can quickly determine the power parameter of the display that is corresponding to the electrical signal detected by the detecting circuit 120 through performing table lookup.

Optionally, the mainboard 100 may also include a level shift IC 150 that is coupled to the processor 110. The level shift IC 150 can switch the input signal from some voltage domain to the voltage domain matching the voltage of the display. The input end of the level shift IC 150 may be connected to the output end of the PMIC 140, so as to convert the voltage signal outputted by the PMIC 140 into the voltage signal matching the voltage of the display. The processor 110 may invoke the timing-control parameter of the display based on the electrical signal detected by the detecting circuit 120 to initialize the level shift IC 150, so that the level shift IC 150 outputs the correct voltage signal to the display to ensure the display's normal operation. It may be appreciated that the correspondence between the timing-control parameter of the display and the electrical signal of the detecting circuit 120 can be stored in the processor 110, so that the processor 110 can quickly determine the timing-control parameter of the display that is corresponding to the electrical signal detected by the detecting circuit 120 through performing table lookup.

An I²C (Inter-Integrated Circuit) bus 170 may also be included in the mainboard 100. The processor 110 may be connected to the level shift IC 150 and the PMIC 140 through the I2C bus 170, so as to control the level shift IC 150 and the PMIC 140 through the I2C bus 170.

In addition, the mainboard 100 may also include a TCON (Timing Controller) 160.

The TCON 160 can provide the timing control signal required by the source driver and the gate driver in the display. The processor 110 may invoke the timing-control parameter of the display based on the electrical signal detected by the detecting circuit 120 to initialize the TCON 160, so that the TCON 160 outputs the correct timing control signal to the display to ensure the display's normal operation. It may be appreciated that the correspondence between the timing-control parameter of the display and the electrical signal of the detecting circuit 120 can be stored in the processor 110, so that the processor 110 can quickly determine the timing-control parameter of the display that is corresponding to the electrical signal detected by the detecting circuit 120 through performing table lookup. The TCON 160 and the processor 110 may both be integrated into an SOC in the mainboard 100.

A display device is provided by the second aspect of the present application. The display device may include the mainboard 100 and the display described in the embodiments above. The display may be connected to the corresponding display interface 130 on the mainboard 100.

Figure 5:
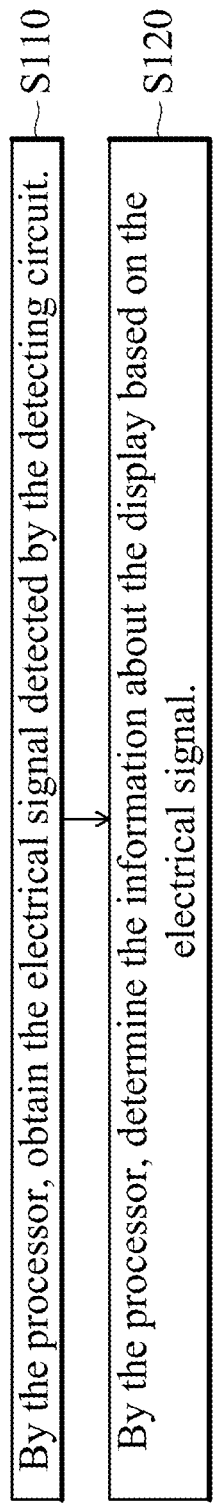
FIG. 5 is the flow diagram of an embodiment of the displaying provided by the present application.

A displaying method, applied in a mainboard including a detecting circuit, at least two display interfaces, and a processor, is provided by the present application. The detecting circuit is electrically connected to the at least two display interfaces, and the processor is coupled to the detecting circuit. As shown in FIG. 5, the displaying includes the following steps.

S110: By the processor, obtain the electrical signal detected by the detecting circuit.

S120: By the processor, determine the information about the display based on the electrical signal.

In this embodiment, the processor may first obtain the electrical signal detected by the detecting circuit, and then determine the information about the display based on the electrical signal, so as to accurately determine the information about the display based on the electrical signal detected by the detecting circuit.

Optionally, the mainboard may also include a PMIC, a level shift IC, and a TCON.

Figure 6:
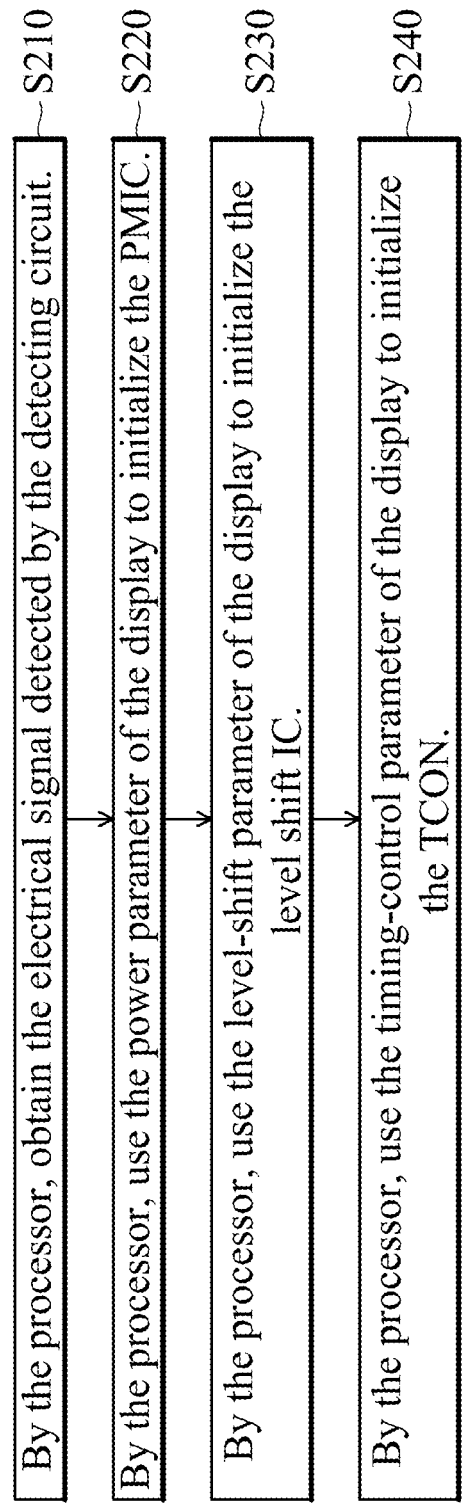
FIG. 6 is the flow diagram of another embodiment of the displaying provided by the present application.

The information about the display includes the power parameter, the level-shift parameter, and the timing-control parameter. As shown in FIG. 6, the displaying may include the following steps.

S210: By the processor, obtain the electrical signal detected by the detecting circuit.

The processor may first obtain the electrical signal detected by the detecting circuit, so as to determine the power parameter, the level-shift parameter, and the timing-control parameter of the display based on the detected electrical signal, so as to initialize the PMIC, the level shift IC, and the TCON using the power parameter, the level-shift parameter, and the timing-control parameter of the display respectively.

The electrical signal detected by the processor may be a voltage signal or a current signal.

S220: By the processor, use the power parameter of the display to initialize the PMIC.

After obtaining the electrical signal detected by the detecting circuit, the processor may initialize the PMIC using the power parameter corresponding to the electrical signal, so that the PMIC outputs the correct voltage to ensure the display's normal operation.

The correspondence between the electrical signal and the power parameter of the display may be stored in the processor, so that the power parameter corresponding to the electrical signal may be known through performing table lookup. Furthermore, the processor may also store the correspondence between the electrical signal and the display index, as well as the correspondence between the display index and the power parameter of the display. The processor may first determine the display index based on the electrical signal, and thereby determine the power parameter corresponding to the display index.

S230: By the processor, use the level-shift parameter of the display to initialize the level shift IC.

After obtaining the electrical signal detected by the detecting circuit, the processor may initialize the level shift IC using the level-shift parameter corresponding to the electrical signal, so as to convert the voltage signal outputted by the PMIC into the voltage signal matching the voltage of the display to ensure the display's normal operation.

The correspondence between the electrical signal and the level-shift parameter of the display may be stored in the processor, so that the level-shift parameter corresponding to the electrical signal may be known through performing table lookup. Furthermore, the processor may also store the correspondence between the electrical signal and the display index, as well as the correspondence between the display index and the level-shift parameter of the display. The processor may first determine the display index based on the electrical signal, and thereby determine the level-shift parameter corresponding to the display index.

S240: By the processor, use the timing-control parameter of the display to initialize the TCON.

After obtaining the electrical signal detected by the detecting circuit, the processor may initialize the TCON using the timing-control parameter corresponding to the electrical signal, so that the TCON outputs the correct signal to the display.

The correspondence between the electrical signal and the timing-control parameter of the display may be stored in the processor, so that the timing-control parameter corresponding to the electrical signal may be known through performing table lookup. Furthermore, the processor may also store the correspondence between the electrical signal and the display index, as well as the correspondence between the display index and the timing-control parameter of the display. The processor may first determine the display index based on the electrical signal, and thereby determine the timing-control parameter corresponding to the display index.

It may be appreciated that the execution sequence of the step S220, the step S230, and the step S240 is not limited. For example, the step S230 may be executed before the step S220. Alternatively, the step S230, the step S240, and the step S220 may be executed simultaneously.

For better understanding the technical scheme of the present application, a specific exemplary embodiment is provided.

Figure 7:
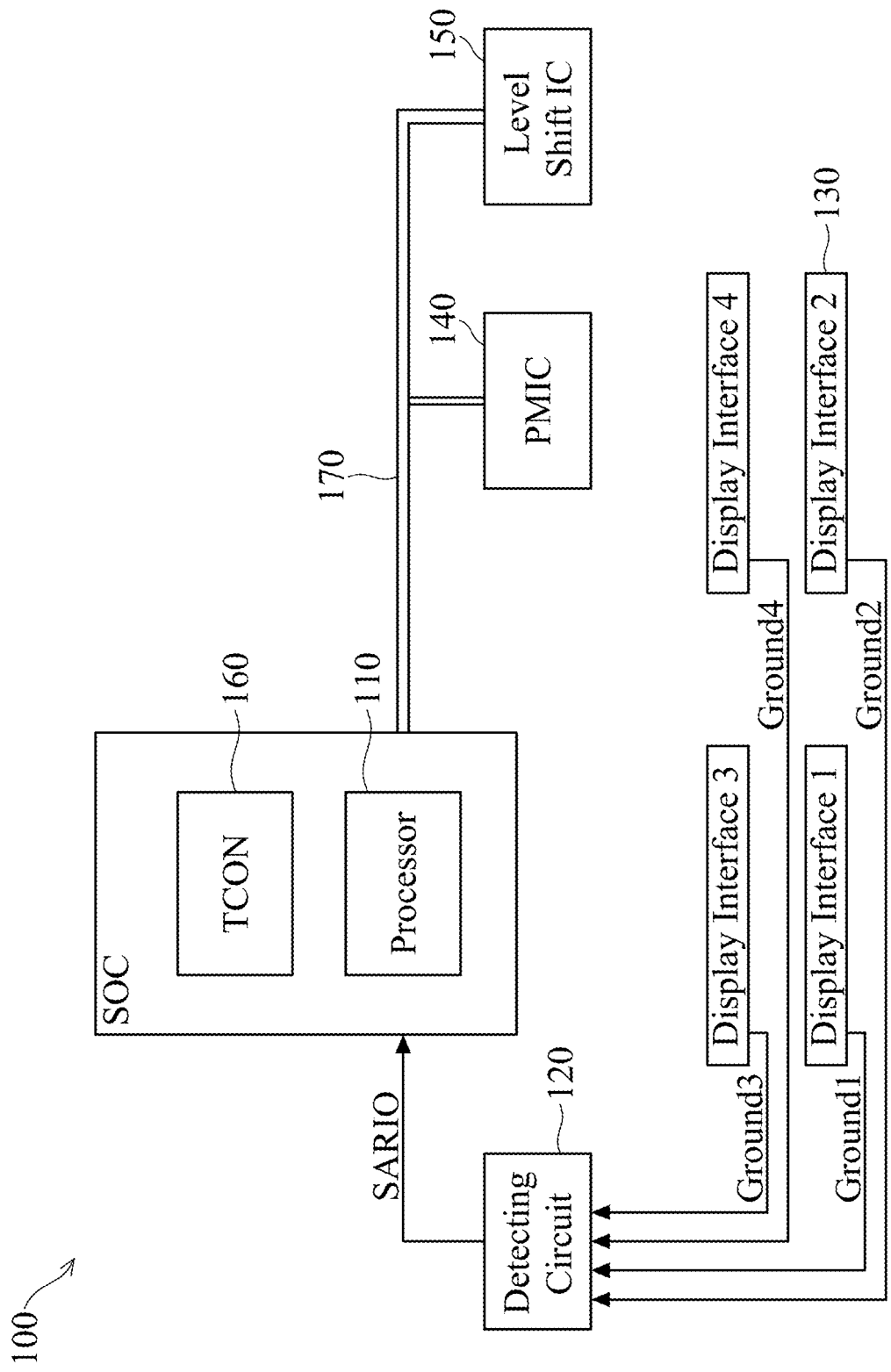
FIG. 7 is the structure diagram of an embodiment of the mainboard provided by the present application.

As shown in FIG. 7, the mainboard 100 includes an SOC, a detecting circuit 120, a PMIC 140, a level shift IC 150, and four display interfaces. The SOC includes a processor 110.

Also referring to Table 1, assuming that the four display interfaces 130 may be used to connect the displays with model 1, model 2, model 3, and model 4. If all the four display interfaces 130 are not connected to the corresponding displays, then Ground1, Ground2, Ground3, and Ground4 are all floating, and the electrical signal detected by the detecting circuit 120 is 3.3V. If the display interface 1 is connected into the corresponding display, then Ground1 will be pulled down, and the electrical signal detected by the detecting circuit 120 becomes 2.7V. If the display interface 2 is connected into the corresponding display, then Ground2 will be pulled down, and the electrical signal detected by the detecting circuit 120 becomes 2.4V. If the display interface 3 is connected into the corresponding display, then Ground3 will be pulled down, and the electrical signal detected by the detecting circuit 120 becomes 2.04V. If the display interface 4 is connected into the corresponding display, then Ground4 will be pulled down, and the electrical signal detected by the detecting circuit 120 becomes 1.73V.

TABLE 1 correspondence between the display model and the electrical signal

| Display | Electrical Signal | Display Index |
| --- | --- | --- |
| No display inserted | 3.3 V | |
| Model 1 | 2.7 V | 001 |
| Model 2 | 2.4 V | 010 |
| Model 3 | 2.04 V | 011 |
| Model 4 | 1.73 V | 100 |

To ensure the accuracy of the display signal that is automatically confirmed by the mainboard 100, the four display interfaces 130 may be different. Specifically, different display interfaces are connected to the detecting circuit 120 with different ground pins. As such, the detecting circuit 120 can detect the electrical signal of the display only when the display is correctly connected to the corresponding display interface 130. If the display is incorrectly connected to other display interfaces 130, the detecting circuit 120 cannot detect the electrical signal of the display, so that the accuracy of the display signal that is automatically confirmed by mainboard 100 is ensured. As previously described, the display connector corresponding to the display with model 1 is connected to the detecting circuit 120 by the $68^{th}$ ground pin, and the display connector corresponding to the display with model 2 is connected to the detecting circuit 120 by the $7^{th}$ ground pin at the XL end.

The processor 110 may predefine the correspondence between the display with a specific model and the electrical signal, such as Table 1. Through the value of the electrical signal provided by the display with the specific model, the processor 110 can accurately determine the specific model of the display that is currently connected to the display interface, so as to provide the information about the display with the specific model, such as the power parameter and the level-shift parameter. After a standard display being connected into the corresponding display interface 130, the detecting circuit 120 in the mainboard 100 can detect the electrical signal of the standard display, the processor 110 in the SOC determines the power parameter and the level-shift parameter of the display based on the electrical signal, and initializes the PMIC 140 and the level shift IC 150 respectively using the power parameter and the level-shift parameter of the display, so that the PMIC 140 outputs an adequate voltage signal to the level shift IC 150, and the level shift IC 150 converts the voltage signal into a voltage signal that matches the voltage of the display, so as to ensure the standard display's normal operation.

In addition, a TCON 160 may also be integrated into the SOC. After the TCON-less display is connected into the corresponding display interface 130, the detecting circuit 120 in the mainboard 100 can detect the electrical signal of the TCON-less display. The processor 110 in the SOC determines the power parameter, the level-shift parameter, and the timing-control parameter of the display based on the electrical signal, and initialize the PMIC 140 and the level shift IC 150 respectively using the power parameter and the level-shift parameter of the display, so that the PMIC 140 outputs an adequate voltage signal to the level shift IC 150. The level shift IC 150 converts the voltage signal into a voltage signal that matches the voltage of the display, so as to ensure that the voltage of the VCON-less display is normal. And the TCON 160 is initialized using the timing-control parameter of the display, so as to ensure that the TCON 160 outputs the correct signal to the TCON-less display. In other words, a single mainboard 100 may be coupled to a variety of specific display models. The single mainboard 100 may self-adjust its determination as to what model of display it is coupled to, provide matching information, and complete the initialization of the display.

Figure 8:
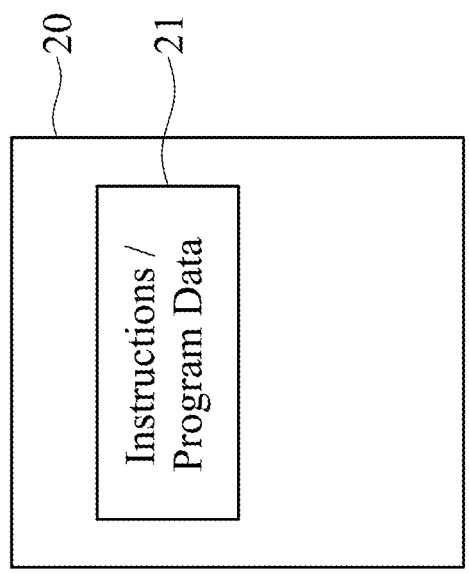
FIG. 8 is the structure diagram of an embodiment of the computer readable storage medium provided by the present application.

Referring to FIG. 8, which is a structural diagram of a computer readable storage medium in an embodiment of the present application. Instructions/program data 21 are stored in the computer readable storage medium 20 of the embodiment of the present application. When the instructions/program data 21 are executed, any embodiment of the displaying method of the present application, as well as methods provided by any compatible combinations, may be implemented. The instruction/program data 21 may form a program file that is stored in the storage medium 20 in form of a software product, causing a computer apparatus (such as a personal computer, a server, or a network apparatus) or a processor to execute all or partial steps of the method in the embodiment of the present application. The storage medium 20 includes mediums that can store program codes, such as USB drives, portable drives, ROMs (Read-Only Memory), RAMs (Random Access Memory), hard drives, optical drives, etc., or terminal apparatus like a computer, server, mobile phone, tablet, etc.

In the embodiments provided by the present application, it should be understood that the disclosed system, device, and method can be implemented through other manners. For example, the division of the units is only a logical function division. In actual implementation, there may be another division manner, for example, multiple units or elements may be combined or integrated into another system, or some features can be ignored, or not implemented. In addition, the displayed or discussed mutual coupling or direct coupling or communication connection may be an indirect coupling or communication connection through some interfaces, devices or units, and may be in electrical, mechanical or other forms.

In addition, each functional unit in each embodiment provided the present application can be integrated in a processing unit, or each unit is individually physically present, it is also possible to which two or more units are integrated in a unit. The integrated unit can be realized in the form of hardware, and it can also be realized in the form of a software functional unit.

The above are only the embodiments of the present application, and do not therefore limit the scope of the present application. Any equivalent structure or equivalent process transformation made by the content of the creation specification and the drawings, or directly or indirectly used in other related technical fields. The same reason is included in the patent protection scope of this creation.

What is claimed is:

1. A mainboard, comprising:
at least two display interfaces, arranged to connect to different models of displays, wherein when a first display interface of the at least two display interfaces connects to a display, other display interfaces of the at least two display interfaces do not connect to any display, wherein the different models of displays include Tcon and Tcon-less displays;
a detecting circuit, coupled to the at least two display interfaces, arranged to detect an electrical signal of the display; and
a processor, coupled to the detecting circuit, arranged to determine information about the display that is connected to the first display interface based on the electrical signal detected by the detecting circuit, such that whether the display is a Tcon display or a Tcon-less display is detected, wherein the information about the display includes driving information to provide initialization for the display;
wherein the mainboard further comprises at least two paralleling detecting resistors, one end of each of the detecting resistors is connected to the at least two display interfaces, and another end of each of the detecting resistors is connected to the processor.

2. The mainboard as claimed in claim 1, wherein the mainboard further comprises a PMIC (Power Manage Integrated Circuit) that is coupled to the processor, and the information about the display comprises a power parameter of the display; and
wherein the processor uses the power parameter of the display to initialize the PMIC.

3. The mainboard as claimed in claim 2, wherein the mainboard further comprises a Level Shift IC (Level Shift Integrated Circuit) that is coupled to the processor, and the information about the display comprises a level-shift parameter; and
wherein the processor uses the level-shift parameter of the display to initialize the Level Shift IC.

4. The mainboard as claimed in claim 2, wherein the mainboard further comprises a TCON (Timing Controller) that is coupled to the processor, and the information about the display comprises a timing-control parameter; and
wherein the processor uses the timing-control parameter of the displays to initialize the TCON.

5. The mainboard as claimed in claim 1, wherein the detecting circuit comprises a modulus converter that is connected to the another end of the detecting resistors.

6. The mainboard as claimed in claim 1, wherein a first detecting resistor of the detecting circuit is coupled to a first interface of a first display, and a second detecting resistor of the detecting circuit is coupled to a second interface of a second display, wherein the first interface is different from the second interface.

7. The mainboard as claimed in claim 1, wherein the electrical signal is a voltage signal, and the processor stores a table of correspondence between the voltage signal and the information about the display.

8. A display device, comprising the displays and the mainboard of claim 1, wherein the displays are connected to a corresponding display interface on the mainboard.

9. A displaying method, applied in a mainboard comprising a detecting circuit, at least two interfaces arranged to connect to different models of displays, and a processor, wherein the detecting circuit is electrically connected to the at least two interfaces, and the processor is coupled to the detecting circuit, the method comprising:
by the processor, obtaining an electrical signal detected by the detecting circuit, wherein when a first display interface of the at least two display interfaces connects to a display, other display interfaces of the at least two display interfaces do not connect to any display, wherein the different models of displays include Tcon and Tcon-less displays; and by the processor, determining information about the display that is connected to the first display interface based on the electrical signal, such that whether the display is a Tcon display or a Tcon-less display is detected, wherein the information about the display includes driving information to provide initialization for the display;

wherein the detecting circuit further comprises at least two paralleling detecting resistors, one end of each of the detecting resistors is connected to the at least two display interfaces, and another end of each of the detecting resistors is connected to the processor.

10. The displaying method as claimed in claim 9, wherein the mainboard comprises a PMIC (Power Manage Integrated Circuit) and a TCON (Timing Controller), and the information about the display comprises a power parameter and a timing-control parameter of the display, the method further comprising:

by the processor, using the power parameter of the display to initialize the PMIC, thereby causing the PMIC to output a correct voltage to the display; and by the processor, using the timing-control parameter of the display to initialize the TCON, thereby causing the TCON to output a correct signal to the display.

11. A non-transitory computer readable storage medium, on which a computer program is stored, wherein steps of the method of claim 9 are performed when the program is executed by the processor.

* * * * *